(12) United States Patent
Itoh et al.

(10) Patent No.: US 9,878,857 B2
(45) Date of Patent: Jan. 30, 2018

(54) TRANSPORTATION DEVICE AND CONVEYOR DEVICE

(71) Applicant: Itoh Denki Co., Ltd., Kasai-shi, Hyogo (JP)

(72) Inventors: Kazuo Itoh, Kasai (JP); Tatsuhiko Nakamura, Hyogo (JP); Makoto Mitsuyoshi, Kakogawa (JP)

(73) Assignee: Itoh Denki Co., Ltd. (JP)

( * ) Notice: Subject to any disclaimer, the term of this patent is extended or adjusted under 35 U.S.C. 154(b) by 0 days.

(21) Appl. No.: 15/121,238

(22) PCT Filed: Feb. 26, 2015

(86) PCT No.: PCT/JP2015/055600
§ 371 (c)(1),
(2) Date: Aug. 24, 2016

(87) PCT Pub. No.: WO2015/129803
PCT Pub. Date: Sep. 3, 2015

(65) Prior Publication Data
US 2016/0362260 A1 Dec. 15, 2016

(30) Foreign Application Priority Data
Feb. 28, 2014 (JP) ................. 2014-039733

(51) Int. Cl.
*B65G 47/64* (2006.01)
*B65G 47/52* (2006.01)
(Continued)

(52) U.S. Cl.
CPC .......... *B65G 47/643* (2013.01); *B65G 15/00* (2013.01); *B65G 15/12* (2013.01); *B65G 47/52* (2013.01);
(Continued)

(58) Field of Classification Search
CPC ...... B65G 47/52; B65G 47/54; B65G 47/643; B65G 47/644; B65G 47/647
See application file for complete search history.

(56) References Cited

U.S. PATENT DOCUMENTS

| 1,549,499 A | 8/1925 | Parker |
| 3,173,554 A | 3/1965 | Ebbert |

(Continued)

FOREIGN PATENT DOCUMENTS

| GB | 1441125 A | 6/1976 |
| JP | 50-9758 Y1 | 3/1975 |

(Continued)

OTHER PUBLICATIONS

International Preliminary Report on Patentability, issued Sep. 6, 2016, in Appln. No. PCT/JP2015/055600.
(Continued)

*Primary Examiner* — Thomas Randazzo
(74) *Attorney, Agent, or Firm* — Wood, Phillips, Katz, Clark & Mortimer

(57) ABSTRACT

The objective is to develop a conveying device and a conveyer device having high conveying efficiency and high reliability when an article is transferred to a conveyer line with different height. Branching units (8) of a lower-level side conveyer line (5) and an upper-level side conveyer line (6) are connected to an inclined connection conveyer line (10). The branching unit (8) has a sub conveying passage (53) for conveying an article (60) in the same direction as a conveying direction of the connection conveyer line (10). The sub conveying passage (53) has a lifting and lowering motor-incorporating roller (43) and cams (46a, 46b). When the lifting and lowering motor-incorporating roller (43) is driven, the cams (46a, 46b) rotate, and the sub conveying passage (53) is connected to the connection conveyer line (10) in an inclined attitude. As a result, the article (60) can (Continued)

move between the lower-level side conveyer line (5) and the upper-level side conveyer line (6) via the connection conveyer line (10).

17 Claims, 7 Drawing Sheets

(51) Int. Cl.
  *B65G 47/54* (2006.01)
  *B65G 47/66* (2006.01)
  *B65G 15/00* (2006.01)
  *B65G 15/12* (2006.01)
  *B65G 47/57* (2006.01)

(52) U.S. Cl.
  CPC ............ *B65G 47/54* (2013.01); *B65G 47/57* (2013.01); *B65G 47/647* (2013.01); *B65G 47/66* (2013.01)

(56) References Cited

U.S. PATENT DOCUMENTS

| | | | | |
|---|---|---|---|---|
| 3,894,625 A * | 7/1975 | Boyle | ............... | B65G 47/44 198/357 |
| 3,921,789 A * | 11/1975 | Goldinger | ............ | B65G 47/54 198/369.6 |
| 4,962,841 A * | 10/1990 | Kloosterhouse | ....... | B65G 47/54 198/370.09 |
| 5,205,394 A * | 4/1993 | Zeuschner | ............ | B65G 47/54 198/370.1 |
| 5,810,149 A * | 9/1998 | Sandberg | ............... | B65G 47/52 198/369.2 |
| 6,360,869 B1 * | 3/2002 | Itoh | ............... | B65G 23/08 198/370.1 |
| 6,533,100 B2 * | 3/2003 | Wheeler | ............... | B65G 43/08 198/370.09 |
| 7,374,033 B2 * | 5/2008 | Monti | ............... | B65G 47/52 198/429 |
| 8,272,496 B2 * | 9/2012 | Itoh | ............... | B65G 47/54 198/370.1 |
| 8,312,983 B2 * | 11/2012 | Kuo | ............... | H01M 10/0404 108/106 |
| 9,114,939 B2 * | 8/2015 | Artz | ............... | B65G 47/244 |
| 9,296,567 B2 * | 3/2016 | Hammacher | ...... | B65G 47/5181 |
| 2004/0007439 A1 * | 1/2004 | Wolkerstorfer | ........ | B65G 47/53 198/468.6 |
| 2006/0070847 A1 * | 4/2006 | Besch | ............... | B65G 1/0492 198/347.4 |
| 2010/0126826 A1 | 5/2010 | Lundahl | | |

FOREIGN PATENT DOCUMENTS

| | | |
|---|---|---|
| JP | S50009758 Y1 | 3/1975 |
| JP | 80196/1979 U | 6/1979 |
| JP | 08-208031 A | 8/1996 |
| JP | H08258962 A | 10/1996 |
| JP | 2002-114314 A | 4/2002 |
| JP | 2012-051674 A | 3/2012 |
| JP | 2012-051679 A | 3/2012 |
| JP | 2012-250809 A | 12/2012 |
| JP | 2013-230914 A | 11/2013 |

OTHER PUBLICATIONS

Supplementary European Search Report, dated Sep. 28, 2017 in European Patent Application No. EP15755397.

* cited by examiner

TRANSPORTATION DEVICE AND CONVEYOR DEVICE

TECHNICAL FIELD

The present invention relates to a conveying device which configures a part of a conveyer line, and particularly relates to a conveying device capable of changing a conveying direction of a conveyed object to a direction intersecting with a carrying-in direction. Further, the present invention relates to a conveyer device in which conveyer lines are constructed in multistages.

BACKGROUND ART

In an assembly line of products or a delivery location of articles, conveyer lines are often utilized for conveying a conveyed object. For example, a number of conveyer lines are installed vertically and horizontally in the delivery location, and a transfer device is disposed at a position where the conveyer lines cross each other. In other words, the transfer device has a function of carrying out an article from an original conveyer line (a main conveyer line), and transferring the article to another conveyer line (a sub conveyer line), thereby conveying the article to a desired location.

Also, in order to perform the above-described function, the transfer device includes two conveyer units for conveying the article and a lifting and lowering unit for changing a height position of the conveyer unit. The two conveyer units respectively have conveying passages for placing and conveying the conveyed object. The conveying passages of the two conveyer units have mutually different conveying directions. The transfer device is configured so that relative heights of the two conveying passages can be changed by the above-described lifting and lowering unit.

In other words, in this type of transfer device, a top surface of the conveying passage of the conveyer unit which is not involved in the conveyance is retreated downward from a conveying surface of the conveyer line by the lifting and lowering unit. Moreover, a top surface of the conveyer unit which contributes to the conveyance is lifted and exposed as a conveying surface of the conveyer line by the lifting and lowering unit. Also, smooth conveyance is realized without being obstructed by the conveying unit which is not involved in the conveyance, by operating (driving) the conveyer unit that is lifted as the conveying surface.

Further, in recent years, there has been a case where conveyer lines are sterically constructed in the delivery location or the like to effectively utilize a floor area. In other words, a conveyer line in a first floor part, a conveyer line in a second floor part, or further, conveyer lines in multistages are disposed to deliver an article to a desired position.

In a case where the article is transferred from the conveyer line in the first floor part to the conveyer line in the other floor, a lift disclosed in Patent Document 2 is used, for example.

PRIOR ART DOCUMENTS

Patent Documents

Patent Document 1: JP 2012-51679 A
Patent Document 2: SP 2012-51674 A

DISCLOSURE OF INVENTION

Technical Problem

As described above, in the conventional techniques, the lift is used in a case where the article is transferred to the conveyer line in another floor.

However, in the lift, the article is transferred to the conveyer line in the other floor through processes of introducing the article into a car gondola and stopping the car gondola, of lifting and lowering the car gondola to be stopped at a fixed height, and of discharging the article from the car gondola. Accordingly, conveying efficiency is poor. In other words, it takes time to transfer the article to the conveyer line in another floor.

Further, there is also a method in which a conveyer line in a branching passage is installed in an inclined attitude, an article discharged from a transfer device in a lower-level conveyer line is transferred to the conveyer line having the inclined attitude, and is transferred to an upper-level conveyer line by climbing the conveyer line having the inclined attitude. However, in this configuration, since an angle is formed between a conveying surface of the transfer device and a conveying surface of the branching passage, there is a case where a corner of the article collides with the conveying surface of the branching passage during movement of the article along the branching passage, and the article cannot be transferred to the branching passage. In other words, smoothness in transfer is lacking and reliability is low in the method in which the conveyer line in the branching passage is installed in the inclined attitude.

Therefore, in consideration of the above-described problems of the conventional techniques, an object of the present invention is to develop a conveying device and a conveyer device having high conveying efficiency and high reliability when an article is transferred to a conveyer line with different height.

Solution to Problem

In order to solve the above-described problem, a first aspect of the present invention is a conveying device including a main conveyer unit that includes a main conveying passage disposed in a fixed planar region and that conveys a conveyed object in a fixed direction, a sub conveyer unit that includes a sub conveying passage disposed in the same planar region as the main conveying passage and that conveys the conveyed object in a direction intersecting with the conveying direction of the main conveying passage, and a lifting and lowering unit that lifts and lowers at least one of the main conveyer unit and the sub conveyer unit, the lifting and lowering unit being capable of lifting the sub conveying passage above the main conveying passage, wherein when the sub conveying passage is disposed above the main conveying passage, the sub conveying passage takes an inclined attitude in a height direction.

The conveying device of the present aspect is used as a part of a conveyer device in which conveyer lines are constructed in multistages. For example, the conveying device is used for the purpose of transferring an article (a conveyed object) from a lower-level conveyer line to an upper-level conveyer line.

For example, the conveying device of the present aspect is used as a part of the lower-level conveyer line, and a connection line in an inclined attitude is provided beside the conveying device to connect to the upper-level conveyer line.

Here, the conveying device of the present aspect has the main conveyer unit and the sub conveyer unit, and the lifting and lowering unit enables lifting the sub conveying passage above the main conveying passage. Also, in the conveying device of the present aspect, when the sub conveying passage is disposed above the main conveying passage, the sub conveying passage takes the inclined attitude in the height direction. Accordingly, a relative angle between the sub conveying passage and the connection line becomes small, and the article is transferred from the sub conveying passage to the connection line without resistance.

Preferably, the main conveying passage and the sub conveying passage include a plurality of conveying bodies that come into contact with the conveyed object to provide conveying force to the conveyed object, the conveying bodies being disposed at intervals, the conveying bodies of the sub conveying passage appearing from between the conveying bodies of the main conveying passage, the sub conveyer unit includes a swinging frame that mounts the conveying bodies of the sub conveying passage thereon, one end-side of the swinging frame being axially fixed rotatably, and the sub conveying passage takes the inclined attitude in the height direction by moving another end-side of the swinging frame in an up and down direction.

In the conveying device of this preferable aspect, the swinging frame swings around the one end, and the sub conveying passage takes the inclined attitude in the height direction.

Preferably, the main conveying passage and the sub conveying passage include a plurality of conveying bodies that come into contact with the conveyed object to provide conveying force to the conveyed object, the conveying bodies being disposed at intervals, the conveying bodies of the sub conveying passage appearing from between the conveying bodies of the main conveying passage, a main conveying surface that places the conveyed object is configured with the plurality of conveying bodies of the main conveying passage, a sub conveying surface that places the conveyed object is configured with the plurality of conveying bodies of the sub conveying passage, and when the sub conveying passage is lifted above the main conveying passage by the lifting and lowering unit, the sub conveying surface is moved above the main conveying surface.

Preferably, the main conveying passage is configured with a roller conveyer, whereas the sub conveying passage is configured with a belt conveyer.

Preferably, the lifting and lowering unit includes a cam that lifts and lowers the sub conveying passage.

Preferably, the cam has an involute curved surface, and the sub conveyer unit has a rotating body disposed on the involute curved surface of the cam.

In the conveying device of this preferable aspect, the rotating body is disposed on the involute curved surface of the cam of the lifting and lowering unit. Accordingly, as the cam rotates, the rotating body of the sub conveyer unit is supported by the cam while rotating on the cam. Because of this, the other end-side of sub conveyer unit smoothly moves in the up and down direction with the axially fixed one end-side as a fulcrum.

Preferably, the lifting and lowering unit includes a motor-incorporating roller having a rotating roller body, and the cam is integrally formed with the roller body.

Preferably, the sub conveyer unit has a pair of the swinging frames, the respective swinging frames being separately disposed in a longitudinal direction of the conveying bodies of the sub conveying passage, and one of the swinging frames is axially fixed rotatably, and the other swinging frame moves in the up and down direction.

A second aspect of the present invention includes a lower-level side conveyer line installed in a lower level, an upper-level side conveyer line installed in an upper level, and a connection line connecting the lower-level side conveyer line and the upper-level side conveyer line, wherein the conveying device of the first aspect of the present information is provided into at least one of the conveyer lines to form a branching unit, and wherein the connection line is installed in an inclined attitude near the conveying device.

Here, it is desirable that the "connection line" is a conveyer for conveying a conveyed object by power. However, in a case where the conveyed object is conveyed from the upper-level side conveyer line to the lower-level side conveyer line, the power is not necessarily required. In a case where the "connection line" is used only for conveying the conveyed object from the upper-level side conveyer line to the lower-level side conveyer line, it may be formed by simply aligning idling rollers or idling small rollers or may be a simple slope.

According to the conveyer device of the present aspect, a relative angle between the sub conveying passage and the connection line becomes small, and the article (the conveyed object) can be transferred from the sub conveying passage to the connection line without resistance.

Preferably, idling roller is disposed between the sub conveying passage and the connection line, the idling roller intersecting with a conveying direction of the connection line, and an extension line of a conveying surface of the connection line abuts on an outer peripheral surface of the idling roller. When the sub conveying passage takes an inclined attitude, an extension line of a conveying surface of the sub conveying passage abuts on the outer peripheral surface of the idling roller.

Since the conveyer device of this preferable aspect has the idling roller between the sub conveying passage and the connection line, a placing part of the conveyed object can be formed between the sub conveying passage and the connection line. Further, when the power is applied from the sub conveying passage or the connection line, the conveyed object moves while rotating the idling roller. Accordingly, the conveyed object is smoothly moved on the idling roller.

Further, since the extension line of the conveying surface of the connection line abuts on the outer peripheral surface of the idling roller, the conveyed object can be smoothly transferred from the connection line to the idling roller or from the idling roller to the connection line.

Moreover, when the sub conveying passage takes the inclined attitude, since the extension line of the conveying surface of the sub conveying passage abuts on the outer peripheral surface of the idling roller, the conveyed object can be smoothly transferred from the sub conveying passage to the idling roller or from the idling roller to the sub conveying passage.

Effect of Invention

The conveying device and the conveyer device of the present invention have effects of high conveying efficiency and high reliability when an article is transferred to a conveyer line with different height.

BEST MODE FOR CARRYING OUT THE INVENTION

Figure 1:
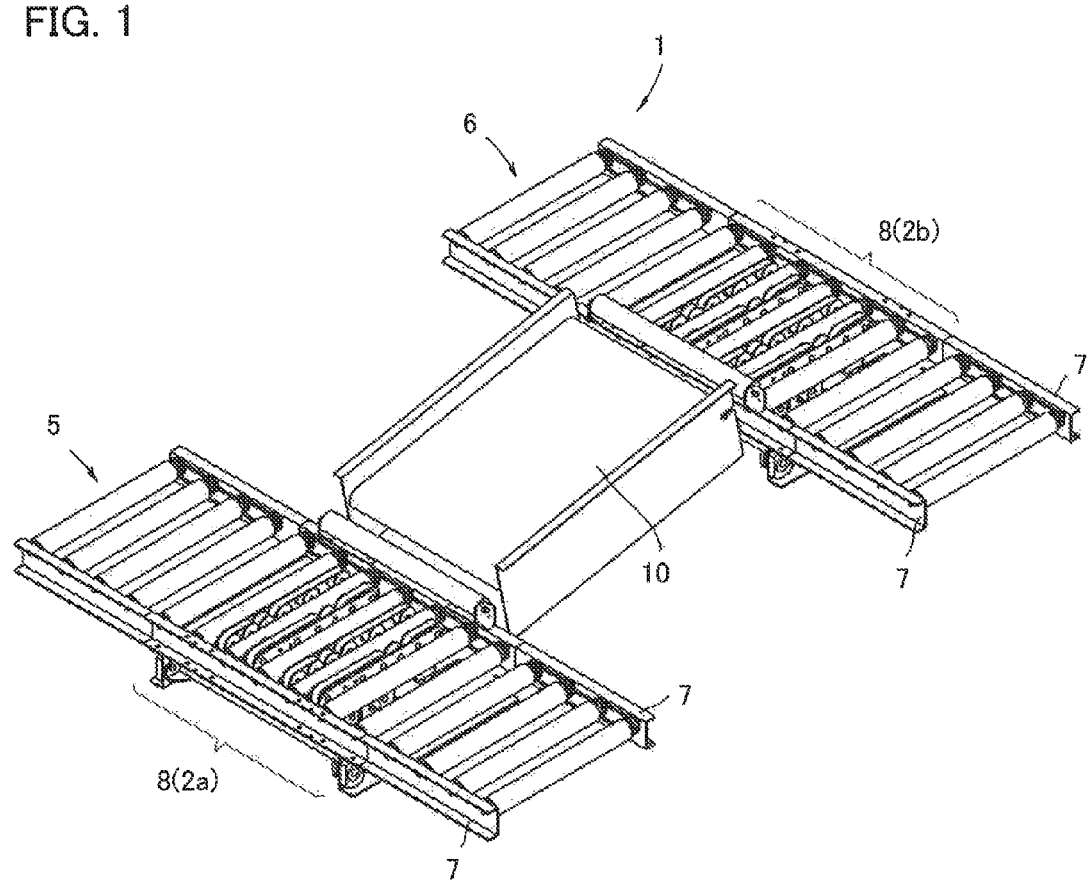
FIG. 1 is a perspective view of a conveyer device according to an embodiment of the present invention.

A conveyer device 1 and a conveying device 2 according to an embodiment of the present invention will be further described below.

The conveyer device 1 of the present embodiment is a device in which conveyer lines are sterically disposed, and includes a lower-level side conveyer line 5 installed in a lower level and an upper-level side conveyer line 6 installed in an upper level.

Both of the lower-level side conveyer line 5 and the upper-level side conveyer line 6 have the same structure and are roller conveyer devices.

In other words, a plurality of rollers are provided between two frame members 7 disposed parallel to each other. Some of the rollers are motor-incorporating rollers, and the motor and a reduction gear are built in a roller body. The roller body is rotated by feeding power to the motor.

The other rollers are follower rollers. A belt is suspended between the follower rollers and the motor-incorporating rollers, and the follower rollers are rotated by receiving power transmission from the motor-incorporating rollers.

Both of the lower-level side conveyer line 5 and the upper-level side conveyer line 6 are divided into a plurality of zones and can be driven/stopped for each zone.

Branching units 8 exist at portions of the lower-level side conveyer line 5 and the upper-level side conveyer line 6, and conveying devices 2a, 2b are utilized for the branching units 8. The conveying device 2a which configures the portion of the lower-level side conveyer line 5 and the conveying device 2b which configures the portion of the upper-level side conveyer line 6 are devices having the same structure. Accordingly, in a case where there is no need to distinguish between the two, the conveying devices 2a, 2b will be simply denoted below as a conveying device 2.

Further, the conveying devices 2a, 2b are connected by a connection conveyer line (a connection line) 10. The connection conveyer line 10 is installed in an inclined attitude and connects the lower-level side conveyer line 5 and the upper-level side conveyer line 6. The connection conveyer line 10 is a belt conveyer. A detailed description of the connection conveyer line 10 is omitted.

Figure 2:
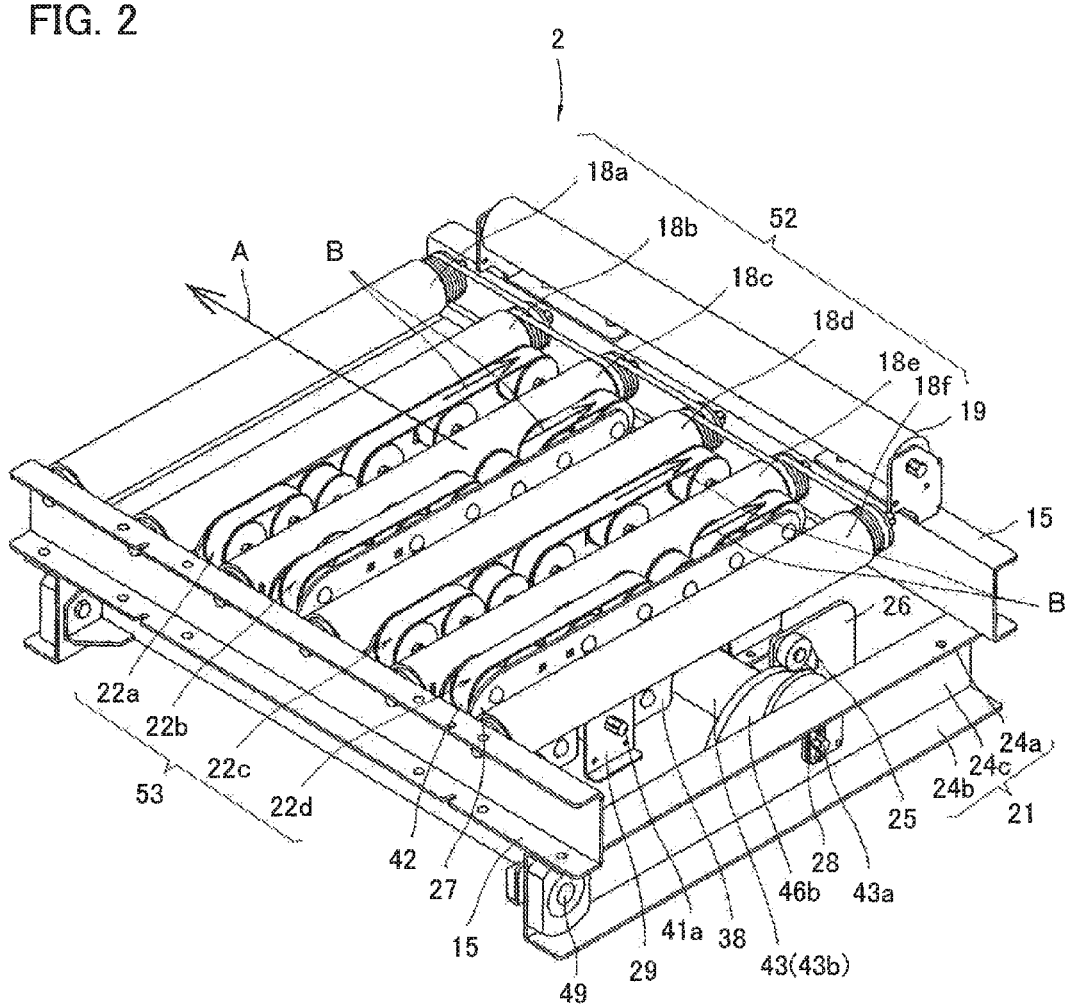
FIG. 2 is a perspective view of a conveying device according to the embodiment of the present invention.
Figure 3:
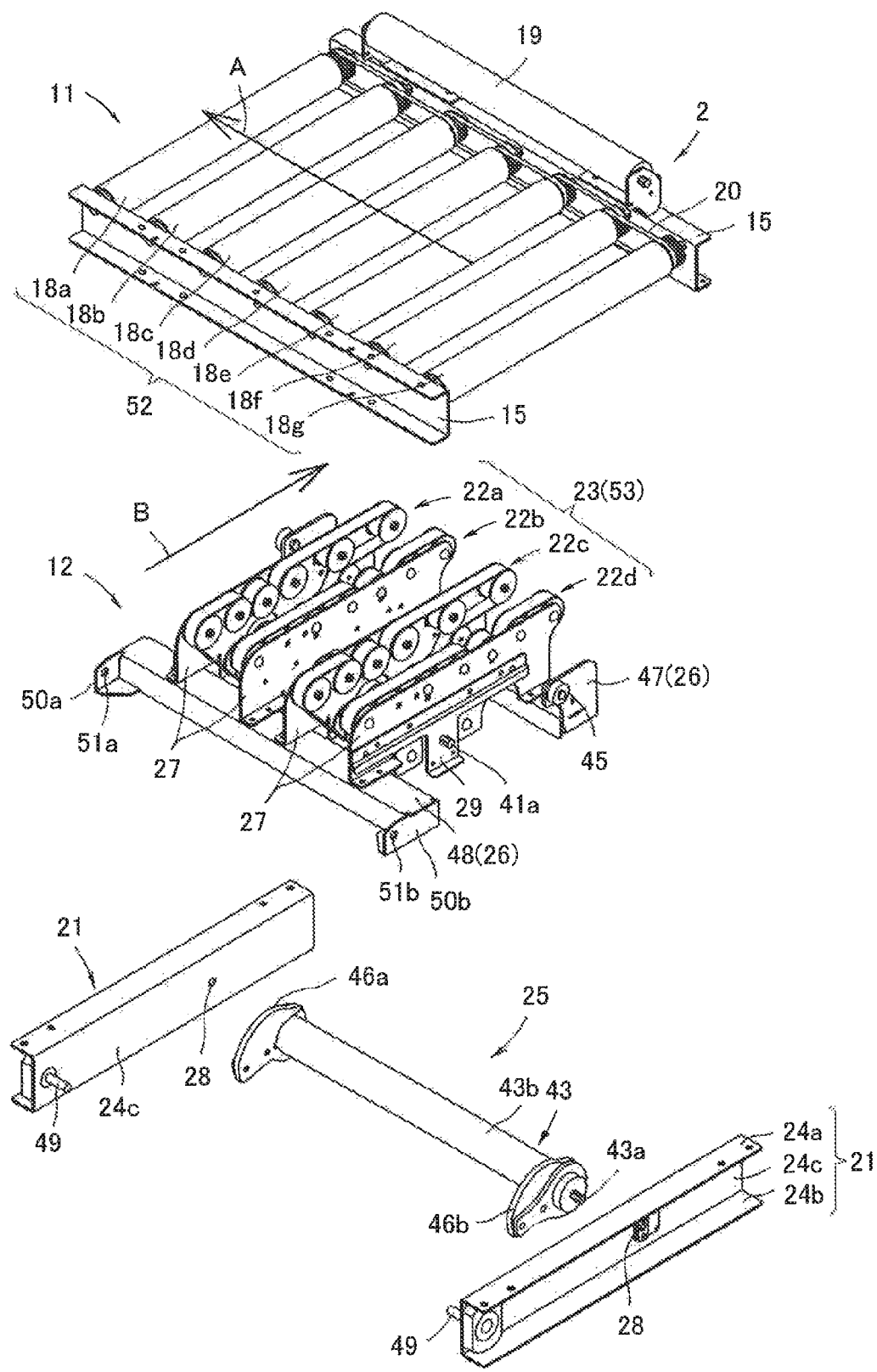
FIG. 3 is a perspective view of the conveying device in FIG. 2 in a state in which a main conveyer unit and a sub conveyer unit are separated.

FIG. 2 shows the conveying device 2 of the present embodiment. As shown in FIG. 3, the conveying device 2 has a main conveyer unit 11 and a sub conveyer unit 12.

The main conveyer unit 11 is a roller conveyer, and seven rollers 18a, 18b, 18c, 18d, 18e, 18f, 18g are disposed between two parallel main conveying side frame members 15 disposed parallel to each other with a fixed gap in between.

Among the seven rollers, the central roller 18c is a motor-incorporating roller. The other rollers 18a, 18b, 18d, 18e, 18f, 18g are follower rollers. A belt 20 is suspended between the follower rollers and the roller 18c serving as the motor-incorporating roller, and the follower rollers are rotated by receiving power transmission from the motor-incorporating roller. A main conveying passage 52 is configured with the seven rollers 18a, 18b, 18c, 18d, 18e, 18f, 18g. In FIGS. 2 and 3, a conveying direction of the main conveying passage 52 is indicated by arrow A. The conveying direction may be a direction opposite to the direction of arrow A. Further, heights of uppermost parts of the seven rollers 18a, 18b, 18c, 18d, 18e, 18f, 18g coincide with one another, and a main conveying surface 52a (FIG. 8) is formed on the uppermost parts of the seven rollers 18a, 18b, 18c, 18d, 18e, 18f, 18g. The main conveying passage 52 conveys an article 60 (a conveyed object) in the direction indicated by arrow A or the direction opposite to the direction indicated by arrow A.

Further, in the present embodiment, an auxiliary roller 19 is provided at one of the main conveying side frame members 15. In other words, the auxiliary roller 19 is provided on the main conveying side frame member 15 on a side to which the connection conveyer line 10, which will be described below, is connected. A rotation shaft of the auxiliary roller 19 intersects with (is orthogonal to) a rotation shaft of the roller 18a. As shown in FIG. 2, the auxiliary roller 19 has a length ranging from the roller 18a to the roller 18f. Further, the auxiliary roller 19 is an idling roller.

In the conveying device 2 of the present embodiment, the sub conveyer unit 12 is provided below the main conveying side frame members 15 of the above-described main conveyer unit 11.

As shown in FIG. 3, the sub conveyer unit 12 has a pair of sub conveying side frame members 21 provided in a direction orthogonal to the main conveying side frame members 15 of the main conveyer unit 11.

The pair of sub conveying side frame members 21 is disposed oppositely and parallel to each other at a predetermined interval. As shown in FIG. 3, each sub conveying side frame member 21 has two parallel flange parts 24a, 24b and a web 24c. Each sub conveying side frame member 21 can be formed of, for example, channel-shaped steel or C-shaped steel.

As shown in FIG. 2, the main conveying side frame members 15 are fixed onto the upper flange parts 24a.

A swinging pin 49 which protrudes inward is provided at the web 24c of each sub conveying side frame member 21. The respective swinging pins 49 are disposed in horizontal attitudes and height positions thereof coincide with each other. Further, centers of the respective swinging pins 49 are disposed on the same straight line.

Further, the web 24c is provided with a supporting part 28 for supporting a lifting and lowering device 25 (a lifting and lowering unit), which will be described below. The supporting part 28 is configured with a bearing.

A narrow conveyer group 23 (FIG. 4) is disposed between the pair of sub conveying side frame members 21. The narrow conveyer group 23 is swingably mounted to the sub conveying side frame members 21 on both sides thereof.

The narrow conveyer group 23 is formed by providing four rows of narrow conveyers 22a to 22d at a swinging frame 26.

The swinging frame 26 is a frame made of known recessed steel or the like. In other words, as shown in FIG. 3, the swinging frame 26 has a pair of main beams 47, 48 disposed at a fixed interval. Lengths of the main beam 47, 48 are shorter than an interval between the pair of sub conveying side frame members 21.

A short roller 45 (rotating body) functioning as a cam follower is provided at the one main beam 47. Extension members 50a, 50b are provided at both ends of the other main beam 48. The extension members 50a, 50b have opposite surfaces which are opposite to each other. Also, holes 51a, 51b are provided on the opposite surfaces of the extension members 50a, 50b. Centers of the holes 51a, 51b are disposed on the same straight line.

Figure 4:
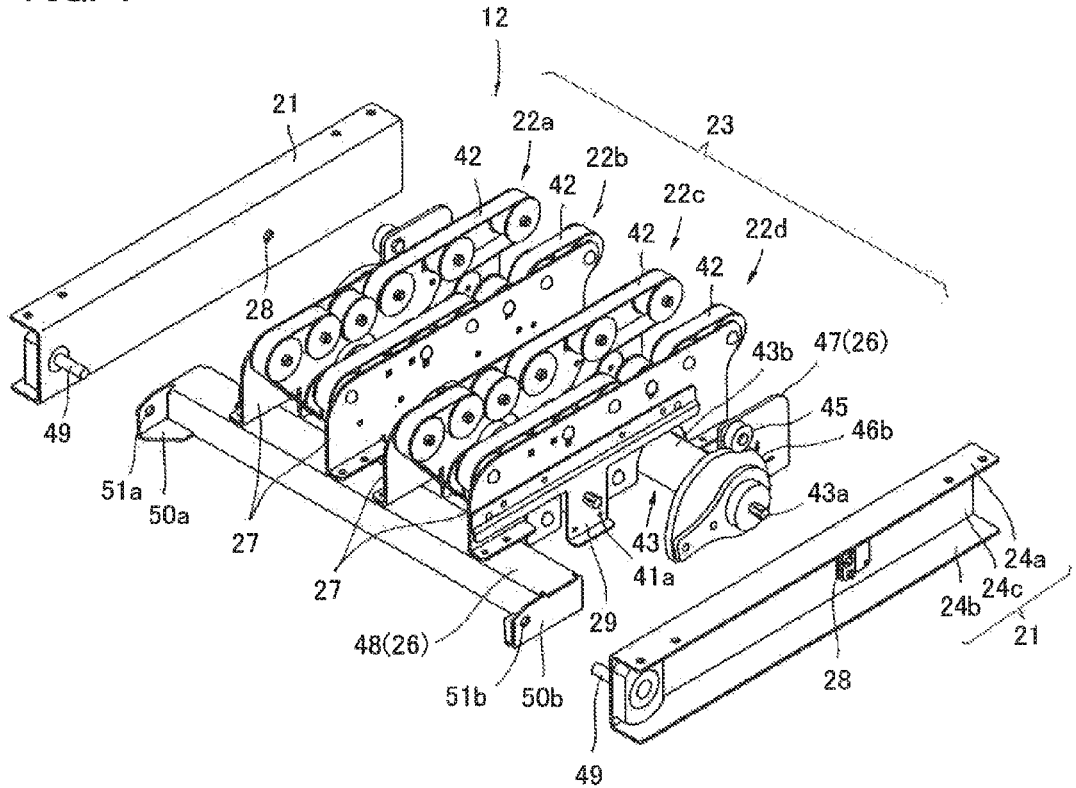
FIG. 4 is an exploded perspective view of the sub conveyer unit of the conveying device in FIG. 2.
Figure 5:
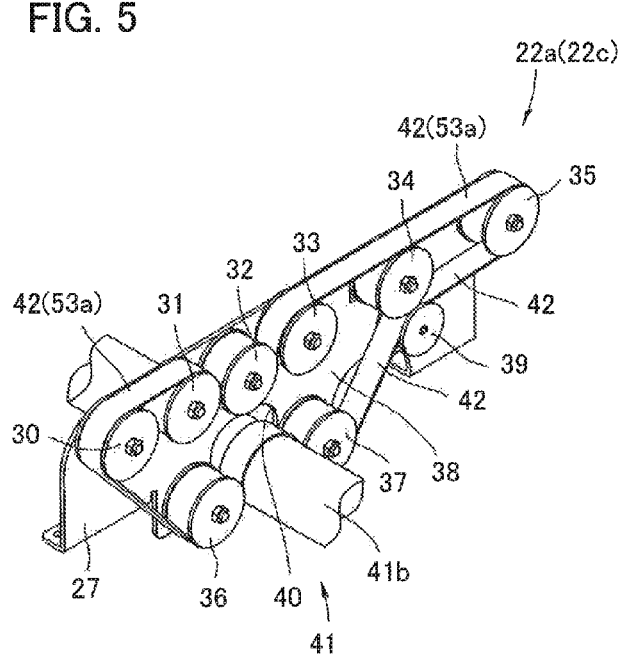
FIG. 5 is a perspective view of a narrow conveyer device of the sub conveyer unit of the conveying device in FIG. 2.
Figure 6:
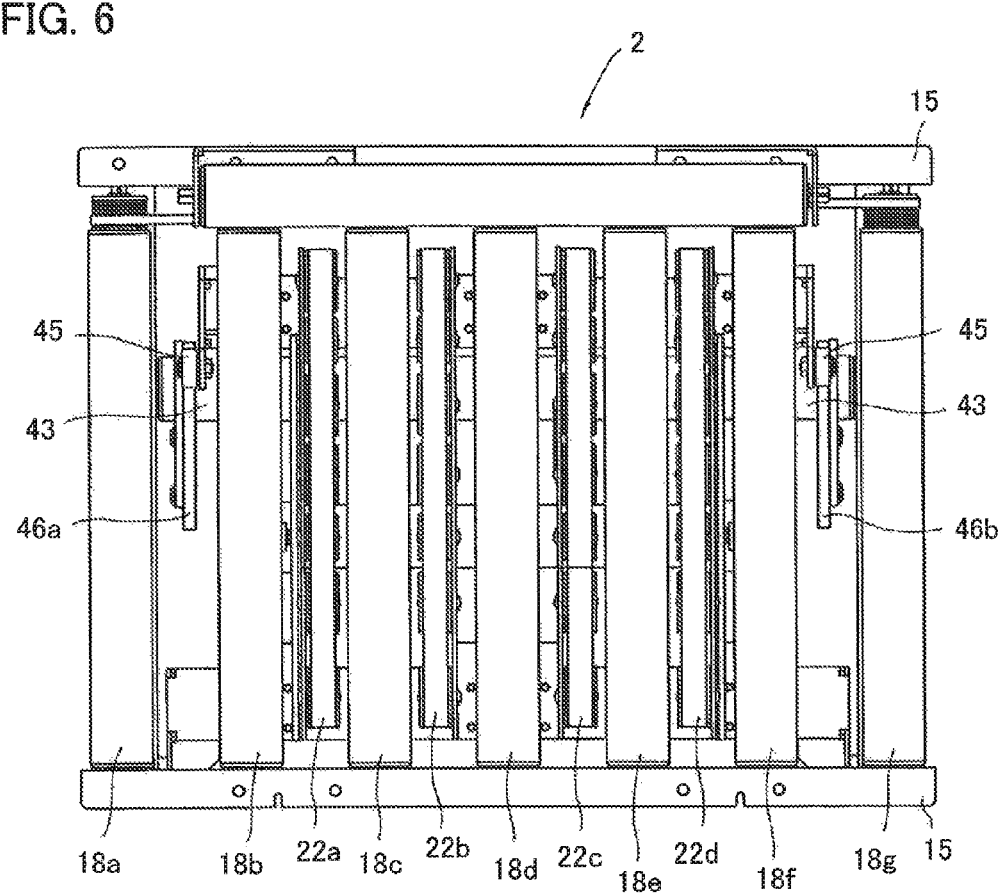
FIG. 6 is a plan view of the conveying device in FIG. 2.

Any of the narrow conveyers 22a to 22d has one plate-shaped member 27, and as shown in FIGS. 4 and 5, eight pulleys 30 to 37 are supported by this portion in a cantilever state.

All of the plate-shaped members 27 have the same shape and substantially belt-shaped. Also, a protruding part 38 which protrudes downward is provided at a bottom center of the plate-shaped member 27. Further, the protruding part 38 is provided with an arc-shaped cut-away part 40.

As shown in FIGS. 3 and 4, a plate-shaped supporting member 29 is fixed to the narrow conveyer 22d. Although not shown for convenience of illustration, the narrow conveyer 22a is also provided with the similar supporting member 29. The supporting members 29 are disposed outside the narrow conveyer group 23. In other words, the supporting members 29 project downward to cover outsides of the cut-away parts 40 of the plate-shaped members 27 of the narrow conveyers 22a, 22d.

As described above, the eight pulleys 30 to 37 are supported by the plate-shaped member 27 in the cantilever state. All of these pulleys 30 to 37 are freely idled. FIG. 5 shows arrangement of the pulleys 30 to 37, and the six pulleys 30 to 35 are provided in a row on an upper surface of the plate-shaped member 27. Also, the remaining two pulleys 36, 37 are provided near the protruding part 38 of the plate-shaped member 27.

It should be noted that FIG. 5 shows a perspective view of the narrow conveyers 22a, 22c, and that a side of the plate-shaped member 27, to which the pulleys are mounted, of the narrow conveyer 22a, 22c is opposite to that of the narrow conveyer 22b, 22d.

The plate-shaped members 27 are fixed in vertical attitudes to the respective swinging frames 26 (the main beams 47, 48) at fixed intervals.

Further, a conveying motor-incorporating roller 41 is inserted into the cut-away parts 40 of the respective plate-shaped members 27. In other words, the conveying motor-incorporating roller 41 is disposed inside the cut-away parts 40 of the respective plate-shaped members 27.

The conveying motor-incorporating roller 41 has a shaft part 41a and a roller body 41b. The shaft part 41a is fixed to the supporting member 29. A motor and a reduction gear (not shown) are provided inside the roller body 41b. In other words, the shaft parts 41a at both ends of the conveying motor-incorporating roller 41 are fixed to the two opposite supporting members 29, and the roller body 41b rotates when power is supplied to the motor (not shown).

Also, a belt 42 is suspended between the pulleys 30 to 37 provided at the plate-shaped member 27 and the roller body 41b of the conveying motor-incorporating roller 41. It should be noted that a toothed belt is adopted for the belt 42 in the present embodiment.

When the conveying motor-incorporating roller 41 is rotated, the belts 42 of the entire narrow conveyers 22a to 22d is driven.

A sub conveying passage 53 is configured with the respective belts 42 of the narrow conveyers 22a to 22d. Further, heights of the uppermost part of the respective belts 42 of the narrow conveyers 22a to 22d coincide with one another. A sub conveying surface 53a is formed on the uppermost parts of these respective belts 42. The sub conveying passage 53 conveys the article 60 in a direction indicated by arrow B in FIG. 3. The direction indicated by arrow 13 intersects with (is orthogonal to) the conveying direction of the main conveying passage 52 of the main conveyer unit 11 indicated by arrow A.

As described above, in the present embodiment, the eight pulleys 30 to 37 are mounted on the plate-shaped member 27, and the six pulleys 30 to 35 of these are provided at upper positions. Regarding the pulleys 30, 31, 33, 34, 35 of the six pulleys 30 to 35, upper sides of the pulleys 30, 31, 33, 34, 35 are engaged with the belt 42. However, regarding the pulley 32 disposed in an intermediate part, the belt 42 is suspended on a lower side of the pulley 32. This is to apply appropriate tension to the belt 42 on the sub conveying passage 53 (the sub conveying surface 53a).

As shown in FIG. 5, a tension pulley 39 is further provided at the plate-shaped member 27. The tension pulley 39 presses a region of the belt 42 where the sub conveying surface 53a is not configured and applies tension to the belt 42.

Next, the lifting and lowering device 25 will be described.

As shown in FIG. 3, the lifting and lowering device 25 is configured with one lifting and lowering motor-incorporating roller 43 and cams 46a, 46b mounted on the lifting and lowering motor-incorporating roller 43.

The lifting and lowering motor-incorporating roller 43 has a shaft part 43a and a roller body 43b. A motor and a reduction gear (not shown) are disposed inside the roller body 43b. The shaft parts 43a at both ends of the lifting and lowering motor-incorporating roller 43 are respectively supported by the supporting parts 28 (the bearings) of the sub conveying side frame members 21. Further, as shown in FIG. 4, the lifting and lowering motor-incorporating roller 43 is disposed below the narrow conveyer group 23. The roller body 43b rotates when power is supplied to the motor (not shown).

The cams 46a, 46b are involute cams having involute-shaped cam surfaces. In other words, peripheral surfaces of the cams 46a, 46b form involute curved surfaces.

The cams 46a, 46b are provided at both ends of the roller body 43b of the lifting and lowering motor-incorporating roller 43. When power is supplied to the motor (not shown) inside the lifting and lowering motor-incorporating roller 43, the cams 46a, 46b integrally rotate with the roller body 43b.

Next, a positional relation of the respective members which configure the sub conveyer unit 12 will be described. As described above, the narrow conveyer group 23 is formed by integrally fixing the narrow conveyers 22a to 22d to the swinging frames 26 (the main beams 47, 48).

The swinging pins 49 of the sub conveying side frame members 21 are inserted into the holes 51a, 51b provided at the extension plates 50a, 50b of the swinging frame 26. In other words, one end-side (the main beam 48 side) of the narrow conveyer group 23 is supported by the sub conveying side frame members 21.

Further, the short rollers 45 of the swinging frame 26 on another end-side (the main beam 47 side) of the narrow conveyer group 23 are installed on the cams 46a, 46b. In other words, the short rollers 45 are mounted on the cams 46a, 46b.

Therefore, when the lifting and lowering motor-incorporating roller 43 is driven and the cams 46a, 46b are rotated together with the roller body 43b, one end of the swinging frame 26 is lifted and lowered due to actions of the cams 46a, 46b, and the swinging frame 26 (the narrow conveyer group 23) swings. In other words, the narrow conveyer group 23 swings around the swinging pin 49 in an up and down direction. At this time, since the peripheral surfaces of the cams 46a, 46b are involute-shaped, the short rollers 45 are supported by the cams 46a, 46b while rotating on the earns 46a, 46b.

Further, the sub conveyer unit 12 is provided below the main conveying side frame members 15 of the above-described main conveyer unit 11.

In other words, the main conveyer unit 11 and the sub conveyer unit 12 are disposed in a common planar region, and the narrow conveyers 22a to 22d of the sub conveyer unit 12 are disposed between any of the seven rollers 18a to 18g of the main conveyer unit 11.

In the example shown in FIG. 2, the narrow conveyer 22a is disposed between the roller 18b and the roller 18c. Similarly, the narrow conveyers 22b, 22c, 22d are respectively disposed between the roller 18c and the roller 18d, between the roller 18d and the roller 18e, and between the roller 18e and the roller 18f. In other words, the narrow conveyers 22a to 22d and the rollers 18b to 18f are alternately disposed in a plane view. Since the number of narrow conveyers is arbitrarily set, for example, in a case there are six narrow conveyers, the narrow conveyer is disposed between the roller 18a and the roller 18b and between the roller 18f and the roller 18g.

Also, the narrow conveyers 22a to 22d of the sub conveyer unit 12 are always immersed between the seven rollers 18a to 18g of the main conveyer unit 11.

Figure 7:
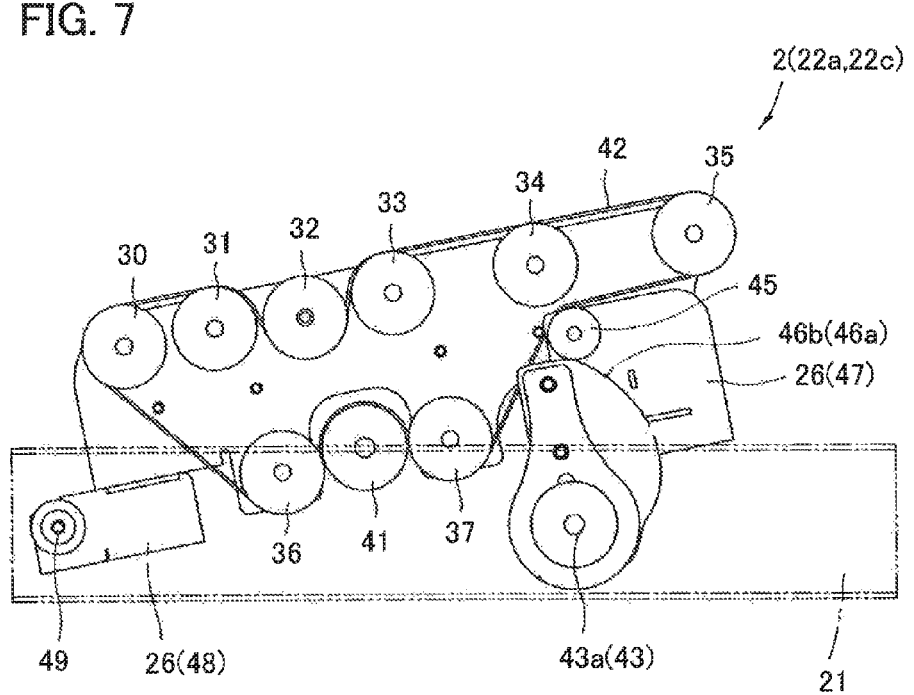
FIG. 7 is a front view showing a main part of the conveying device in FIG. 2.

Also, when the lifting and lowering motor-incorporating roller 43 is rotated to lift the one end-side (the main beam 47 side) of the narrow conveyer group 23, the narrow conveyer group 23 of the sub conveyer unit 12 protrudes above the seven rollers 8a to 18g of the main conveyer unit 11. At this time, the swinging pins 49 are inserted into the one end-side (the main beam 48 side) of the narrow conveyer group 23, and the height on the swinging pin 49 side is not changed. Accordingly, the narrow conveyer group 23 is largely inclined and takes the inclined attitude as shown in FIG. 7.

Next, functions of the conveyer device 1 and the conveying device 2 according to the embodiment of the present invention will be described.

As described above, the conveyer device 1 of the present embodiment has the lower-level side conveyer line 5 and the upper-level side conveyer line 6, and the article 60 (the conveyed object) can be placed thereon and linearly conveyed.

Further, in the conveyer device 1 of the present embodiment, the article 60 can be transferred from the lower-level side conveyer line 5 to the upper-level side conveyer line 6. Alternatively, the article 60 can be transferred from the upper-level side conveyer line 6 to the lower-level side conveyer line 5.

Figure 8:
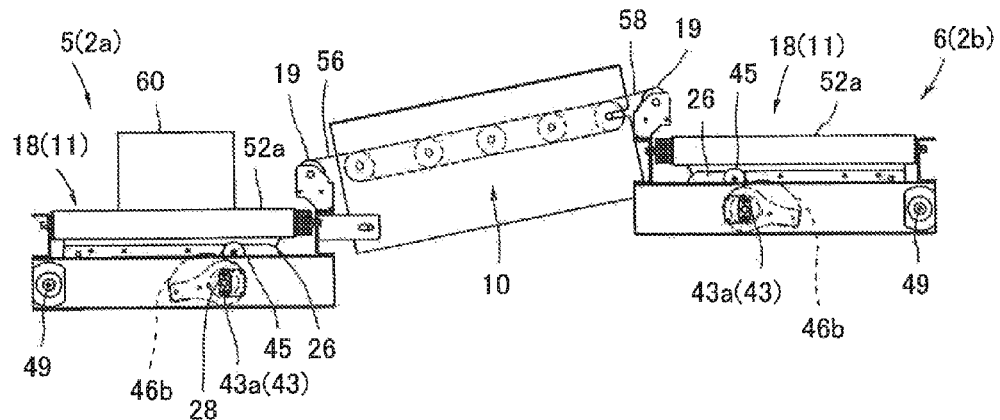
FIG. 8 is a sectional view of the conveyer device in FIG. 1, and shows a state in which an article is conveyed on a lower-level side conveyer line.

For example, in a case where the article 60 is transferred from the lower-level side conveyer line 5 to the upper-level side conveyer line 6, as shown in FIG. 8, the article 60 is introduced to the conveying device 2a of the lower-level side conveyer line 5, and then the article 60 is stopped on the main conveying surface 52a of the conveying device 2a.

In other words, as shown in FIG. 8, in a state in which the sub conveyer unit 12 is immersed in the main conveyer unit 11, the article 60 is placed on the main conveying surface 52a, the rollers 18a, 18b, 18c, 18d, 18e, 18f, 18g of the main conveyer unit 11 are rotated, and the article 60 is introduced to the conveying device 2a. Also, when a sensor (not shown) detects the introduction of the article 60 to the conveying device 2a, rotation of the rollers 18a, 18b, 18c, 18d, 18e, 18f, 18g is stopped.

Figure 9:
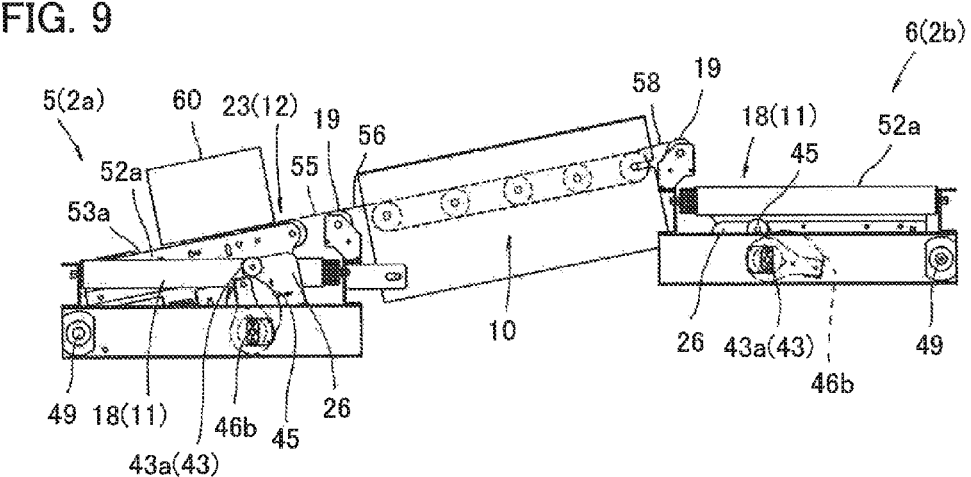
FIG. 9 is a sectional view of the conveyer device in FIG. 1, and shows an action of transferring the article from the lower-level side conveyer line to an upper-level side conveyer line.

Subsequently, as shown in FIG. 9, the lifting and lowering motor-incorporating roller 43 is rotated so as to protrude the narrow conveyer group 23 of the sub conveyer unit 12 above the seven rollers 18a, 18b, 18c, 18d, 18e, 18f, 18g of the main conveyer unit 11. At this time, the narrow conveyer group 23 (the sub conveying surface 53a) is inclined in an attitude in which the connection conveyer line 10 becomes an upper side, and the article 60 is scooped up by the sub conveying surface 53a of the narrow conveyer group 23. As a result, heights of a tip of the sub conveying surface 53a of the narrow conveyer group 23 and the connection conveyer line 10 are substantially matched, and an angular difference between the sub conveying surface 53a of the narrow conveyer group 23 and the conveying surface of the connection conveyer line 10 is made small. Accordingly, the two surfaces are aligned on a substantially straight line. Alternatively, an extension line 55 in the conveying direction of the sub conveying surface 53a abuts on the outer peripheral surface of the auxiliary roller 19. An extension line 56 in the conveying direction of the conveying surface of the connection conveyer line 10 also abuts on the outer peripheral surface of the auxiliary roller 19. In other words, the extension lines 55, 56 are on the same straight line. Here, the extension lines 55, 56 are actually surfaces, but are illustrated as lines in FIG. 9 which is a sectional view.

The conveying motor-incorporating roller 41 (FIG. 7) is rotated in that state to allow the respective belts 42 to drive. Further, rotation of rollers of the connection conveyer line 10 is also started.

Figure 10:
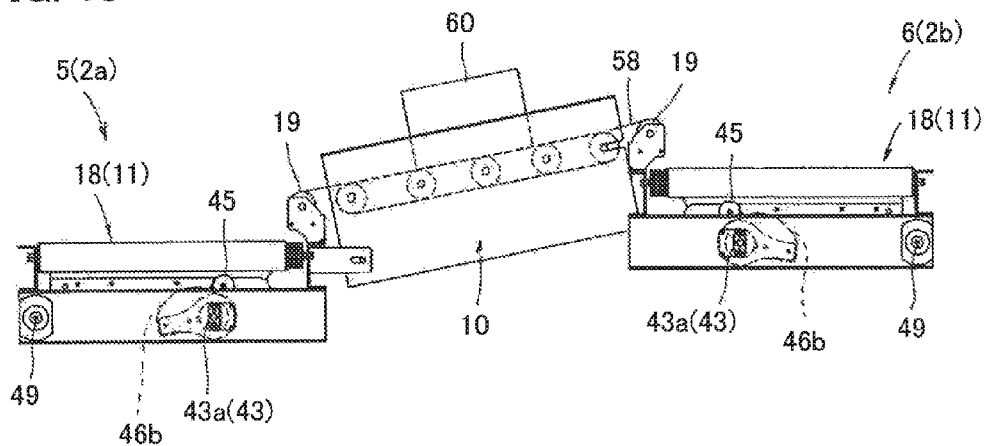
FIG. 10 is a sectional view of the conveyer device in FIG. 1, and shows the action of transferring the article from the lower-level side conveyer line to the upper-level side conveyer line and a state which continues from FIG. 9.

As a result, the article 60 on the sub conveyor unit 12 is moved to the connection conveyer line 10 and transferred to the adjacent connection conveyer line 10 as shown in FIG. 10 by passing through the auxiliary roller 19. In other words, the article 60 is smoothly moved from the sub conveying surface 53a of the sub conveyer unit 12 onto the auxiliary roller 19, and is further moved smoothly onto the conveying surface of the connection conveyer line 10 while rotating the auxiliary roller 19.

Figure 11:
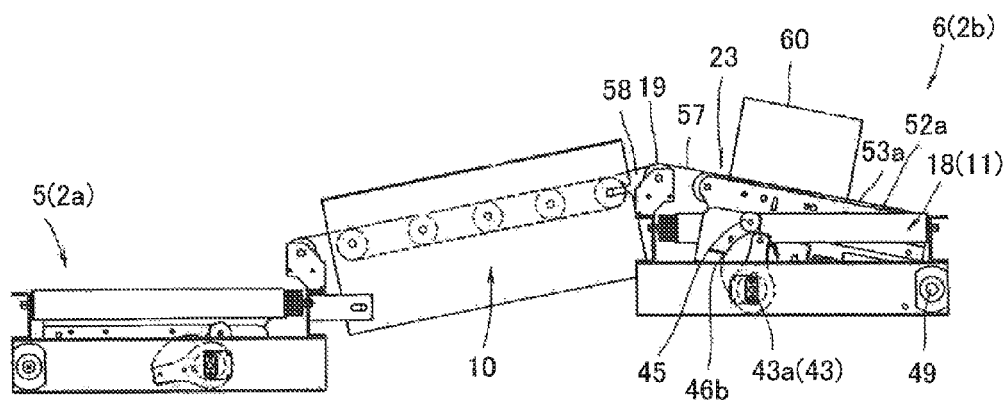
FIG. 11 is a sectional view of the conveyer device in FIG. 1, and shows the action of transferring the article from the lower-level side conveyer line to the upper-level side conveyer line and a state which continues from FIG. 10.

Also, the article 60 is conveyed diagonally upward by the connection conveyer line 10. On the other hand, regarding the upper-level side conveyer line 6 serving as a receiving side as well, as shown in FIG. 11, the lifting and lowering motor-incorporating roller 43 is rotated so as to protrude the narrow conveyer group 23 of the sub conveyer unit 12 above the seven rollers 18a, 18b, 18c, 18d, 18e, 18f, 18g of the main conveyer unit 11. At this time, the sub conveying passage 53 (the sub conveying surface 53a) is inclined in an attitude in which the connection conveyer line 10 becomes an upper side.

At this time, an extension line 57 in the conveying direction of the sub conveying surface 53a of the conveying device 2b abuts on the outer peripheral surface of the auxiliary roller 19. An extension line 58 in the conveying direction of the conveying surface of the connection conveyer line 10 also abuts on the outer peripheral surface of the auxiliary roller 19. The extension lines 57, 58 intersect with each other, and respectively abut on different regions of the outer peripheral surface of the auxiliary roller 19. Here, the extension lines 57, 58 are actually surfaces, but are illustrated as lines in FIG. 11 which is a sectional view.

Also, the conveying motor-incorporating roller 41 is rotated in this state to allow the belts 42 to drive.

As a result, the article 60 conveyed by the connection conveyor line 10 smoothly passes on the auxiliary roller 19. Further, the article 60 is received by the sub conveying surface 53a (the belts 42) of the conveying device 2b and transferred to the conveying device 2b, as shown in FIG. 11.

Figure 12:
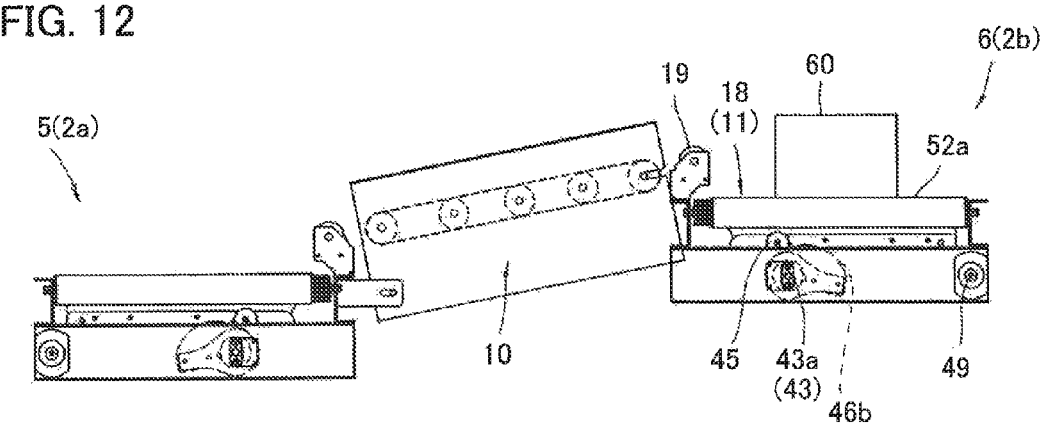
FIG. 12 is a sectional view of the conveyer device in FIG. 1, and shows the action of transferring the article from the lower-level side conveyer line to the upper-level side conveyer line and a state which continues from FIG. 11.

When the sensor (not shown) confirms that the article 60 has been transferred to the conveying device 2b, the lifting and lowering motor-incorporating roller 43 is rotated in a reverse direction, the one end-side (the main beam 47 side) of the narrow conveyer group 23 is lowered, and the attitude of the sub conveyer unit 12 is returned to a horizontal attitude (FIG. 12). At this time, the entire narrow conveyer group 23 of the sub conveyer unit 12 is sunk between the rollers 18a, 18b, 18c, 18d, 18e, 18f, 18g of the main conveyer unit 11, and the article 60 is received by the rollers 18a, 18b, 18c, 18d, 18e, 18f, 18g (the main conveying surface 52a) of the main conveyer unit 11. In other words, the uppermost parts of the rollers 18a, 18b, 18c, 18d, 18e, 18f, 18g of the main conveyer unit 11 configure the main conveying surface 52a, and the article 60 is placed on the main conveying surface 52a of the main conveyer unit 11.

Also, the rollers 18a, 18b, 18c, 18d, 18e, 18f, 18g of the main conveyer unit 11 are rotated to convey the article 60 to a downstream side of the upper-level side conveyer line 6 along the main conveying passage 52.

In the above-described embodiment, the main conveyer unit is the roller conveyer and the sub conveyer device is the narrow belt conveyer. However, the two may be the reverse. In other words, it is possible that the roller conveyer is used for the sub conveyer device and the roller conveyer is inclined.

Further, in the above-described embodiment, the cam is adopted as the lifting and lowering unit. However, a mechanism, such as a crank or a screw, may be applied. Further, a solenoid may be utilized.

Further, in the above description, the present invention is utilized for the purpose of lifting the article 60 from the lower-level side conveyer line 5 to the upper-level side conveyer line 6. However, the present invention can be utilized for the purpose of lowering the article 60 from the upper-level side conveyer line 6 to the lower-level side conveyer line 5.

In a case where the present invention is utilized only for the purpose of lowering the article 60 from the upper-level side conveyer line 6 to the lower-level side conveyer line 5, it is not necessary for the connection line which connects the upper-level side conveyer line 6 and the lower-level side conveyer line S to have power. For example, the connection line may be formed by simply aligning idling rollers or idling small rollers or may be a simple slope. In a case where the slope or the like is adopted, the article 60 is slid down by gravity by utilizing a difference of elevation.

The auxiliary roller 19 is not essential. In a case where the sub conveying surface 53a of the conveying device 2 can be close to the conveying surface of the connection conveyer line 10, the auxiliary roller 19 can be omitted.

The swinging frame 26 may be formed so that the main beam 47 side and the main beam 48 side are continuous. In other words, in the example shown in FIG. 3 or the like, the swinging frame 26 on the main beam 47 and the swinging frame 48 on the main beam 48 are separate members. However, these swinging frames may be formed with one member.

EXPLANATION OF REFERENCE SIGNS

1: conveyer device
2: conveying device
5: lower-level side conveyer line
6: upper-level side conveyer line
8: branching unit
10: connection conveyer line (connection line)
11: main conveyer unit
12: sub conveyer unit
18a to 18g: roller
22a to 22d: narrow conveyer
23: narrow conveyer group
25: lifting and lowering device
26: swinging frame
46a, 46b: cam

The invention claimed is:

1. A conveying device that enables a conveyer line to form a branching unit, the conveying device being capable of placing a conveyed object thereon to transfer as well as to convey linearly, the conveying device comprising:
a main conveyer unit that includes a main conveying passage disposed in a fixed planar region and that conveys the conveyed object in a fixed direction;
a sub conveyer unit that includes a sub conveying passage disposed in the same planar region as the main conveying passage and that conveys the conveyed object in a direction intersecting with the conveying direction of the main conveying passage; and
a lifting and lowering unit that lifts and lowers at least one of the main conveyer unit and the sub conveyer unit, the lifting and lowering unit being capable of causing the sub conveying passage to be directly above the main conveying passage,
wherein when the sub conveying passage is disposed above the main conveying passage, the sub conveying passage takes an inclined attitude in a height direction.

2. The conveying device according to claim 1,
wherein the main conveying passage and the sub conveying passage include a plurality of conveying bodies that come into contact with the conveyed object to provide conveying force to the conveyed object,
the conveying bodies being disposed at intervals,
the conveying bodies of the sub conveying passage appearing from between the conveying bodies of the main conveying passage,
wherein a main conveying surface that places the conveyed object is configured with the plurality of conveying bodies of the main conveying passage, wherein a sub conveying surface that places the conveyed object is configured with the plurality of conveying bodies of the sub conveying passage, and wherein when the sub conveying passage is situated above the main conveying passage by the lifting and lowering unit, the sub conveying surface is moved above the main conveying surface.

3. The conveying device according to claim 1, wherein the main conveying passage is configured with a roller conveyer, whereas the sub conveying passage is configured with a belt conveyer.

4. The conveying device according to claim 1, further comprising an idling roller capable of rotating in a conveying direction of the sub conveying passage.

5. The conveying device according to claim 1,
wherein the main conveying passage and the sub conveying passage include a plurality of conveying bodies that come into contact with the conveyed object to provide conveying force to the conveyed object,
the conveying bodies being disposed at intervals,
the conveying bodies of the sub conveying passage appearing from between the conveying bodies of the main conveying passage,
wherein the sub conveyer unit includes a swinging frame that mounts the conveying bodies of the sub conveying passage thereon,
one end-side of the swinging frame being axially fixed rotatably, and
wherein the sub conveying passage takes the inclined attitude in the height direction by moving another end-side of the swinging frame in an up and down direction.

6. The conveying device according to claim 5,
wherein the sub conveyer unit has a pair of the swinging frames, the respective swinging frames being separately disposed in a longitudinal direction of the conveying bodies of the sub conveying passage, and
wherein one of the swinging frames is axially fixed rotatably, and the other swinging frame moves in the up and down direction.

7. The conveying device according to claim 1, wherein the lifting and lowering unit includes a cam that lifts and lowers the sub conveying passage.

8. The conveying device according to claim 7,
wherein the cam has an involute curved surface, and
wherein the sub conveyer unit has a rotating body disposed on the involute curved surface of the cam.

9. The conveying device according to claim 7,
wherein the lifting and lowering unit includes a motor-incorporating roller having a rotating roller body, and
wherein the cam is integrally formed with the roller body.

10. A conveying device comprising:
a main conveyer unit that includes a main conveying passage disposed in a fixed planar region and that conveys a conveyed object in a fixed direction;
a sub conveyer unit that includes a sub conveying passage disposed in the same planar region as the main conveying passage and that conveys the conveyed object in a direction intersecting with the conveying direction of the main conveying passage; and
a lifting and lowering unit that lifts and lowers at least one of the main conveyer unit and the sub conveyer unit, the lifting and lowering unit being capable of causing the sub conveying passage to be directly above the main conveying passage, wherein when the sub conveying passage is disposed above the main conveying passage, the sub conveying passage takes an inclined attitude in a height direction, and wherein the conveying device further comprises an idling roller capable of rotating in a conveying direction of the sub conveying passage.

11. A conveyer device comprising:
a lower-level side conveyer line installed in a lower level;
an upper-level side conveyer line installed in an upper level; and
a connection line connecting the lower-level side conveyer line and the upper-level side conveyer line,
wherein the conveying device according to claim 1 is provided into at least one of the conveyer lines to form the branching unit, and
wherein the connection line is installed in an inclined attitude near the conveying device.

12. The conveyer device according to claim 11,
wherein an idling roller is disposed between the sub conveying passage and the connection line,
the idling roller intersecting with a conveying direction of the connection line,
wherein an extension line of a conveying surface of the connection line abuts on an outer peripheral surface of the idling roller, and
wherein when the sub conveying passage takes an inclined attitude, an extension line of a conveying surface of the sub conveying passage abuts on the outer peripheral surface of the idling roller.

13. The conveyer device according to claim 11, wherein the conveyed object can be placed on each of the lower-level side conveyer line and the upper-level conveyer line to transfer from one of the conveyer lines to the other of the conveyer lines as well as to convey linearly.

14. The conveyer device according to claim 11, wherein an idling roller is disposed between the sub conveying passage and the connection line, the idling roller intersecting with a conveying direction of the connection line.

15. The conveyer device according to claim 14,
wherein an extension line of a conveying surface of the connection line abuts on an outer peripheral surface of the idling roller, and
wherein when the sub conveying passage takes an inclined attitude, an extension line of a conveying surface of the sub conveying passage abuts on the outer peripheral surface of the idling roller.

16. A conveyer device comprising:
a lower-level side conveyer line installed in a lower level;
an upper-level side conveyer line installed in an upper level; and
a connection line connecting the lower-level side conveyer line and the upper-level side conveyer line,
wherein a conveying device is provided into at least one of the conveyer lines,
the conveying device comprising:
a main conveyer unit that includes a main conveying passage disposed in a fixed planar region and that conveys a conveyed object in a fixed direction;
a sub conveyer unit that includes a sub conveying passage disposed in the same planar region as the main conveying passage and that conveys the conveyed object in a direction intersecting with the conveying direction of the main conveying passage; and
a lifting and lowering unit that lifts and lowers at least one of the main conveyer unit and the sub conveyer unit, the lifting and lowering unit causing the sub conveying passage to be situated above the main conveying passage, wherein when the sub conveying passage is disposed above the main conveying passage, the sub conveying passage takes an inclined attitude in a height direction.

17. The conveyer device according to claim 16, wherein the connection line is installed in an inclined attitude.

* * * * *